United States Patent
Wright et al.

(10) Patent No.: US 10,956,211 B2
(45) Date of Patent: Mar. 23, 2021

(54) METHOD AND APPARATUS OF ALLOCATING AUTOMOTIVE COMPUTING TASKS TO NETWORKED DEVICES WITH HETEROGENEOUS CAPABILITIES

(71) Applicants: GM GLOBAL TECHNOLOGY OPERATIONS LLC, Detroit, MI (US); UNIVERSITY OF SOUTHERN CALIFORNIA, Los Angeles, CA (US)

(72) Inventors: Kwame-Lante Wright, Los Angeles, CA (US); Fan Bai, Ann Arbor, MI (US); Bhaskar Krishnamachari, Los Angeles, CA (US)

(73) Assignees: GM GLOBAL TECHNOLOGY OPERATIONS LLC, Detroit, MI (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 158 days.

(21) Appl. No.: 16/283,944

(22) Filed: Feb. 25, 2019

(65) Prior Publication Data
US 2020/0272509 A1 Aug. 27, 2020

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01)

(58) Field of Classification Search
CPC .............................. G06F 9/4881; G06F 9/5038
See application file for complete search history.

(56) References Cited

U.S. PATENT DOCUMENTS 10,599,471 B1 * 3/2020 Hilton ................... G06F 9/4881
10,671,953 B1 * 6/2020 Xu ....................... H04L 41/0896
2016/0171390 A1 * 6/2016 Mohammad Mirzaei ................
G06N 20/00
706/12

(Continued)

OTHER PUBLICATIONS

Kenny, Kevin B., and K-J. Lin. "Structuring large real-time systems with performance polymorphism." Real-Time Systems Symposium, 1990. Proceedings., 11th. IEEE, Jun. 5-7, 1990.

(Continued)

*Primary Examiner* — Jacob D Dascomb
(74) *Attorney, Agent, or Firm* — Lorenz & Kopf, LLP

(57) ABSTRACT

A task allocation system for dynamically allocating computing tasks to networked computing resources with heterogeneous capabilities includes: a task library having a plurality of tasks, each task being one of a plurality of different implementations of an application, wherein the different implementations of an application provide different levels of accuracy and resource usage during execution, wherein the different implementations are configured based on a trade-off between level of accuracy and resource usage during execution; and a real-time scheduler module configured to monitor available computing resources and connectivity to the computing resources, receive a plurality of task requests, prioritize applications to be executed when performing the tasks wherein more critical applications are assigned a higher priority, allocate computing resources to the higher priority applications, allocate remaining computing resources to other applications, and select specific implementations of applications for assignment to specific computing resources in a way that maximizes an overall utility.

20 Claims, 9 Drawing Sheets

(56) References Cited

U.S. PATENT DOCUMENTS

2019/0009790 A1* 1/2019 Michalakis ............ H04L 67/12
2020/0089675 A1* 3/2020 Boley ................. G06F 16/2465
2021/0020041 A1* 1/2021 Yang ...................... H04N 7/181

OTHER PUBLICATIONS

Liu, Jane W.-S., et al. "Algorithms for scheduling imprecise computations." Foundations of Real-Time Computing: Scheduling and Resource Management. Springer, Boston, MA, May 1991. 203-249.
Kao, Yi-Hsuan, et al. "Hermes: Latency optimal task assignment for resource-constrained mobile computing." IEEE Transactions on Mobile Computing 16.11 (2017): 3056-3069.

* cited by examiner

METHOD AND APPARATUS OF ALLOCATING AUTOMOTIVE COMPUTING TASKS TO NETWORKED DEVICES WITH HETEROGENEOUS CAPABILITIES

TECHNICAL FIELD

The technology described in this patent document relates generally to computer systems and more particularly to distributed processing systems.

Vehicles are becoming data centers on wheels. Vehicles can contain sophisticated processing units which include central processing units (CPUs), graphic processing units (GPUs), field programmable gate arrays (FPGAs), and other processing elements. There is a growing demand for onboard networking and support for vehicle-to-vehicle/vehicle-to-infrastructure (V2V/V2I) communication. With the availability of dedicated short-range communications (DSRC), Wi-Fi and cellular wireless networks (e.g., LTE), vehicles can have greater access to off-board resources such as off-board computing resources (e.g., edge and cloud devices) and off-board sensors (e.g., from other vehicles, traffic cameras, etc.).

Accordingly, it is desirable to provide a real-time distributed processing framework for assisting with increasing processing demand. Furthermore, other desirable features and characteristics of the present invention will become apparent from the subsequent detailed description of the invention and the appended claims, taken in conjunction with the accompanying drawings and the background of the invention.

SUMMARY

Systems and methods for allocating automotive computing tasks to networked devices with heterogeneous capabilities are provided. In one embodiment, a task allocation system for dynamically allocating atomic computing tasks to a suite of networked computing resources with heterogeneous capabilities includes: a task library having a plurality of tasks, each task being one of a plurality of different implementations of an application, wherein the different implementations of an application provide different levels of accuracy and resource usage during execution, wherein the different implementations are configured based on a trade-off between level of accuracy and resource usage during execution; a real-time scheduler module including one or more processors configured by programming instructions on non-transient computer readable media, the scheduler module configured to monitor available computing resources and connectivity to the computing resources, receive a plurality of task requests wherein the task requests are a specification of jobs requested for performance, prioritize applications to be executed when performing the jobs wherein more critical applications are assigned a higher priority, allocate computing resources to the higher priority applications, allocate remaining computing resources to other applications, and select specific implementations of applications for assignment to specific computing resources in a way that maximizes an overall utility; and a dispatcher module including one or more processors configured by programming instructions on non-transient computer readable media, the dispatcher module configured to dispatch the assigned specific implementations of applications to their assigned computing resource for execution.

In one embodiment, the suite of networked computing devices includes onboard hardware and one or more of mobile devices, edge devices and cloud based servers.

In one embodiment, the computing resources includes one or more of central processing units (CPUs), graphic processor units (GPUs), digital signal processors (DSPs), application specific integrated circuits (ASICs), and field programmable gate arrays (FPGAs).

In one embodiment, the real-time scheduler module is configured to: execute a greedy algorithm to determine an assignment of specific implementations of applications to specific computing resources; and output the determined assignment of specific implementations to specific computing resources.

In one embodiment, the greedy algorithm is configured to: rank job implementations based on utility wherein the job implementation with the highest utility is ranked first; and schedule job implementations, in rank order, one by one at a best available node, wherein a job implementation is scheduled if no other implementation of the job has already been scheduled and the best available node is capable of executing the job implementation.

In one embodiment, the greedy algorithm is configured to: enumerate all possible combinations of jobs wherein each possible combination of jobs is referred to as a bundle; determine potential bundle-node pairs; calculate a utility measurement for each potential bundle-node pair; sort the bundles-node pairs in utility order with the bundle-node pair with the highest utility positioned first; and schedule bundles one by one until all nodes have been assigned or all jobs have been scheduled, wherein assigned bundles cannot contain implementations of the same job.

In one embodiment, the task allocation system further includes a task profiles database containing task profiles for each application implementation, the task profiles including static and dynamic data about tasks, including resource use, latency, and reliability, wherein the task profiles are accessible by the scheduler module when selecting specific implementations of applications for assignment to specific computing resources.

In one embodiment, the task allocation system further includes a resource monitor configured to track devices and their available computing resources wherein the real-time scheduler module is configured to monitor available computing resources via information provided by the resource monitor.

In one embodiment, the task allocation system further includes a performance monitor configured to collect statistics about the communication channels and device speed.

In one embodiment, the task allocation system further includes a communications manager configured to manage communication links between devices providing computer resources, the communication links implemented using a plurality of dedicated short-range communications (DSRC), cellular wireless network (e.g., LTE, 5G or others), Ethernet, wireless local area network (WLAN), and controller area network (CAN).

In another embodiment, a processor-implemented method in a vehicle for dynamically allocating automotive computing tasks to a suite of networked computing resources with heterogeneous capabilities is provided. The method includes: receiving, by a processor in the vehicle, task requests for the performance of jobs by computing resources; monitoring, by the processor, the status of and connectivity to the computing resources; identifying, by the processor, specific task implementations for scheduling; scheduling, by the processor, specific task implementations to specific computing resources; retrieving, by the processor, the specific task implementations that have been scheduled from a task library; and dispatching, by the processor, the specific task implementations for execution to the specific computing resources.

In one embodiment, the computing resources include one or more of central processing units (CPUs), graphic processor units (GPUs), digital signal processors (DSPs), application specific integrated circuits (ASICs), and field programmable gate arrays (FPGAs) and the computing resources are located in a plurality of computing devices onboard the vehicle, edge computing devices, and cloud-based computing devices.

In one embodiment, the monitoring includes tracking computing devices and their available computing resources and collecting statistics about communication channels and computing device speed.

In one embodiment, the specific task implementations are identified from a task profiles database that includes static and dynamic data about tasks, including resource use, latency, and reliability.

In one embodiment, the specific task implementations are scheduled based on the static and dynamic data about tasks, available resources, and communication channels and device speed.

In one embodiment, scheduling specific task implementations to specific computing resources includes running a scheduling algorithm to assign jobs to devices for execution wherein the scheduling algorithm includes an ILP-based algorithm or a greedy algorithm.

In one embodiment, the scheduling algorithm includes a greedy algorithm; the greedy algorithm is configured to sort, based on utility ranking, task implementations wherein the task implementation with the highest utility is given the highest ranking; and the greedy algorithm is configured to schedule task implementations, in rank order, one by one at a best available computing resource, wherein a task implementation is scheduled if no other implementation of the task has already been scheduled and the best available node is capable of executing the task implementation.

In one embodiment, the scheduling algorithm includes a greedy algorithm and the greedy algorithm is configured to: enumerate all possible combinations of application implementations, wherein each combination is referred to as a bundle; calculate the utility of each bundle-node pair; sort the bundles-node pairs in utility order with the bundle-node pair with the highest utility positioned first; and schedule bundles one by one until all nodes have been assigned or all jobs have been scheduled, wherein assigned bundles cannot contain implementations of the same job.

In one embodiment, the task library includes binaries of the different task implementations and the different task implementations provide various task implementation options.

In another embodiment, a vehicle is provided. The vehicle includes: a plurality of computing resources; a task library including a plurality of tasks, each task being one of a plurality of different implementations of an application, wherein the different implementations of an application provide different levels of accuracy and resource usage during execution, wherein the different implementations are configured based on a trade-off between level of accuracy and resource usage during execution; a real-time scheduler module including one or more processors configured by programming instructions on non-transient computer readable media, the scheduler module configured to monitor available computing resources and connectivity to the computing resources, receive job requests to execute a plurality of applications, prioritize the applications wherein more critical applications are assigned a higher priority, allocate computing resources to the higher priority applications, allocate remaining computing resources to other applications, and select specific implementations of applications for assignment to specific computing resources in a way that maximizes an overall utility; and a dispatcher module including one or more processors configured by programming instructions on non-transient computer readable media, the dispatcher module configured to dispatch the assigned specific implementations of applications to their assigned computing resource for execution.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1A:
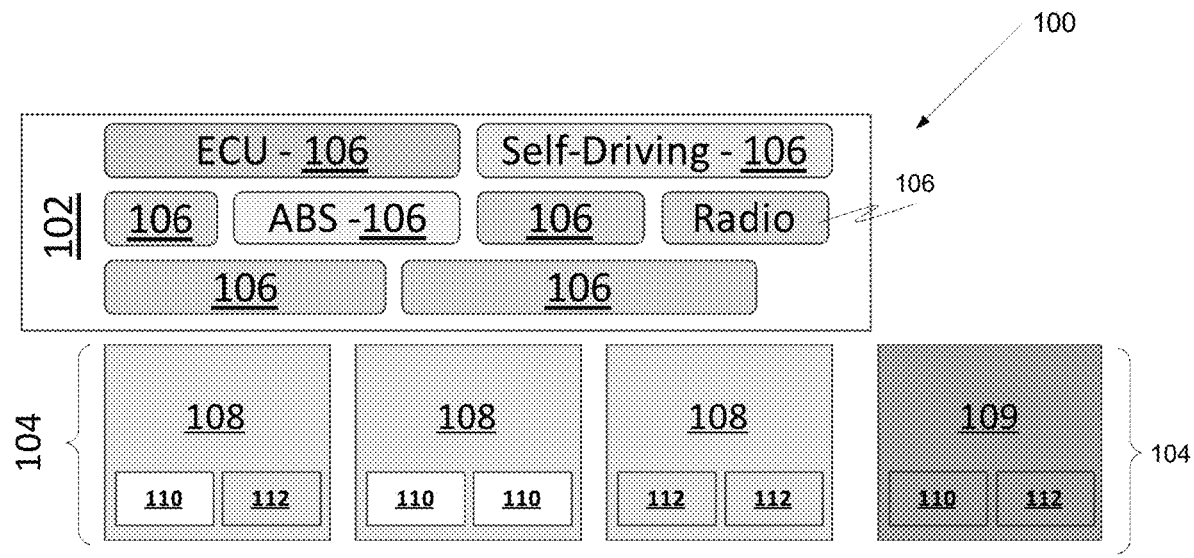
FIG. 1A is a block diagram depicting an example computing environment, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing a real-time distributed processing framework for assisting with increasing processing demand. The following disclosure provides apparatus, systems, techniques and articles for utilizing shared hardware resources for multiple systems thereby reducing costs, improving redundancy, utilizing reusable expertise. The following disclosure provides apparatus, systems, techniques and articles for sharing hardware resources that can provide performance guarantees for safety-critical applications and best-effort for non-critical applications. The following disclosure provides apparatus, systems, techniques and articles that can allow safety-critical applications to coexist with non-critical tasks. The following disclosure provides apparatus, systems, techniques and articles for utilizing polymorphism—utilizing adaptable workloads to satisfy constraints while maintaining functionality. The following disclosure provides apparatus, systems, techniques and articles for utilizing a greedy, heuristic solution to achieve a sub-optimal solution but with quick decision capability. The following disclosure provides apparatus, systems, techniques and articles for utilizing an ILP problem formulation and solution to achieve global optimization.

FIG. 1A is a block diagram depicting an example computing environment 100. The example computing environment includes a software environment 102 and a hardware environment 104. The software environment 102 includes multiple software applications 106 that are to execute at various times using hardware from the hardware environment 104. In this example, the example computing environment includes an automobile computing environment and the example software includes software applications that may be found in an automobile. In this example, the example software includes engine control unit (ECU) software, anti-lock braking system (ABS) software, cruise control software and radio software, among others. Some of the software is more important to the safe operation of the vehicle and consequently is considered higher priority software, whereas some of the software is less important to the safe operation of the vehicle and is considered lowered priority software. As an example, the ABS software would be considered higher priority software and the radio software would be considered lower priority software. When the computing resource requirement of the software environment 102 exceeds the computing capability of the hardware environment 104, the software in the software environment 102 may need to be prioritized so that the higher priority software can always execute when execution is needed.

The hardware environment includes a plurality of processing modules 108, 109. Each processing module 108 may include multiple computing resources such as a central processing unit (CPU) 110, a graphics processing unit (GPU) 112, and/or other computing resources. The processing modules 108, 109 may be distributed in a distributed network. Some of the processing modules (e.g., processing modules 108) may be local and some (e.g., processing module 109) may be remote. The various processing modules, in addition to being local or remote, may also have different computing capabilities and different access times (e.g., based on the communication network through which they are accessible). In the example of a vehicle, the local processing modules 108 may be located onboard the vehicle, and the remote processing modules 109 may be located off board the vehicle.

Figure 1B:
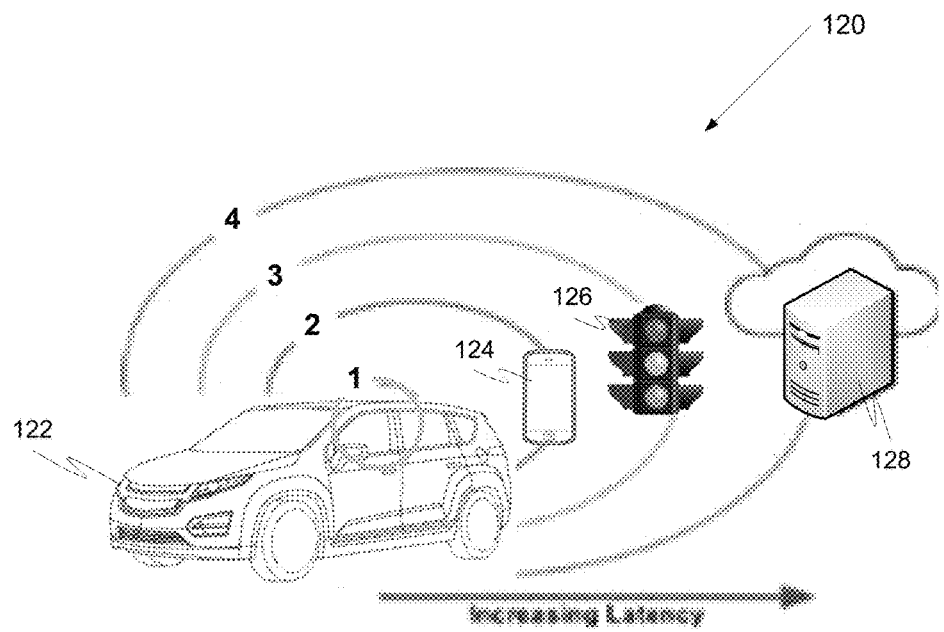
FIG. 1B is a diagram depicting an example vehicle in an example computing environment and illustrating various levels at which processing modules may be located relative to the example vehicle, in accordance with various embodiments.

FIG. 1B is a diagram depicting an example vehicle 122 in an example computing environment 120 and illustrating various levels at which processing modules may be located relative to the example vehicle 122. In this example, the example environment 120 includes processing modules that are located onboard the vehicle 122 in a first level (1). The example environment 120 may also include mobile processing modules 124 (e.g., contained in a mobile device such as a smart phone, tablet, phablet, etc.) that are located within or in very close proximity to the vehicle 122 in a second level (2). The example environment 120 may include edge processing modules 126 (e.g., contained in edge devices such as traffic device or sign) that are located in close proximity to the vehicle 122 in a third level (3). The example environment 120 may include cloud processing modules 128 (e.g., contained in cloud device such as a server) that are accessible to the vehicle 122 in a fourth level (4).

The example computing environments 100 and 120 implement a task allocation system that is configured to allocate computing tasks from the software environment (e.g., software environment 102) to various processing modules based on priority, computing requirements, and computing capabilities.

Figure 2:
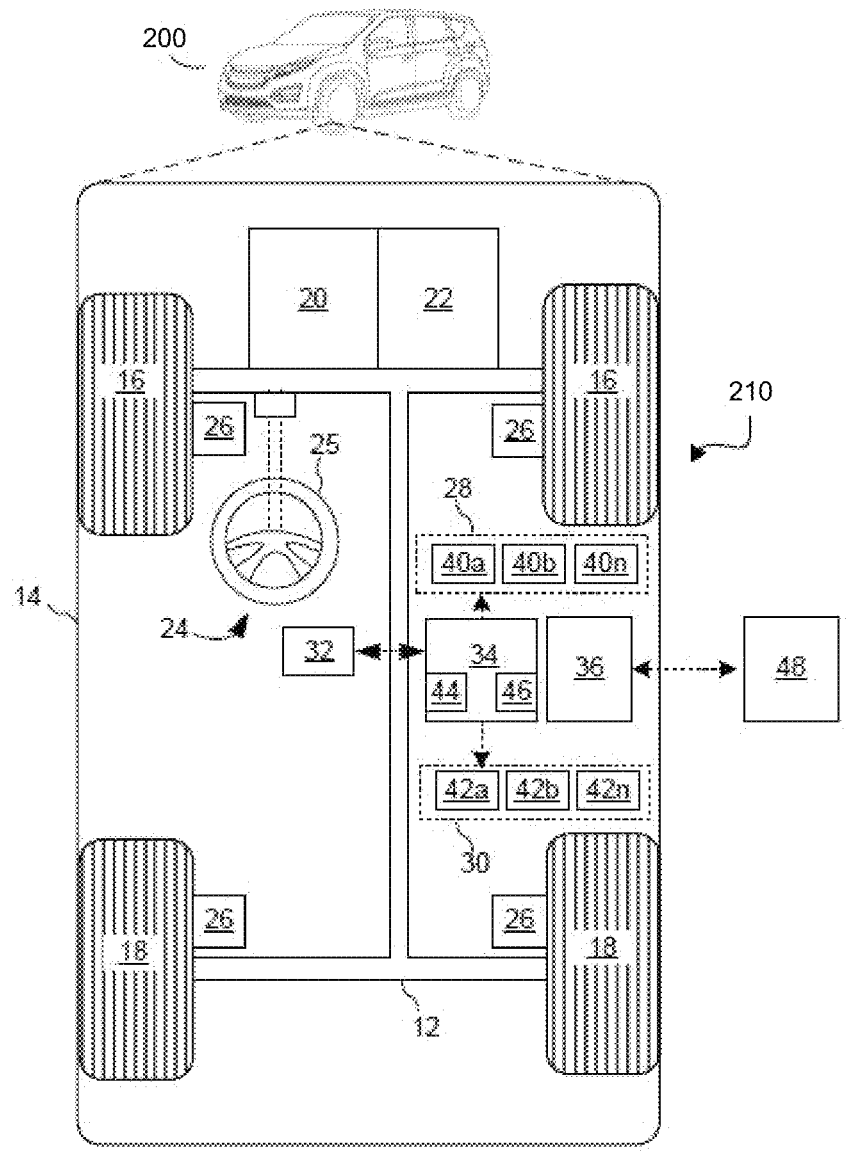
FIG. 2 depicts an example vehicle that includes a task allocation system, in accordance with various embodiments.

FIG. 2 depicts an example vehicle 200 that includes a task allocation system 210. As depicted in FIG. 1, the vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14.

In various embodiments, the vehicle 200 may be an autonomous vehicle or a semi-autonomous vehicle. An autonomous vehicle 200 is, for example, a vehicle that is automatically controlled to carry passengers from one location to another. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 200 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 200 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 200 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 200. In various embodiments, the data storage device 32 stores defined maps of the navigable environment. In various embodiments, the defined maps may be predefined by and obtained from a remote system. For example, the defined maps may be assembled by the remote system and communicated to the vehicle 200 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 200. In various embodiments, controller 34 is configured to implement a mapping system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 200, and generate control signals that are transmitted to the actuator system 30 to automatically control the components of the vehicle 200 based on the logic, calculations, methods, and/or algorithms. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 3:
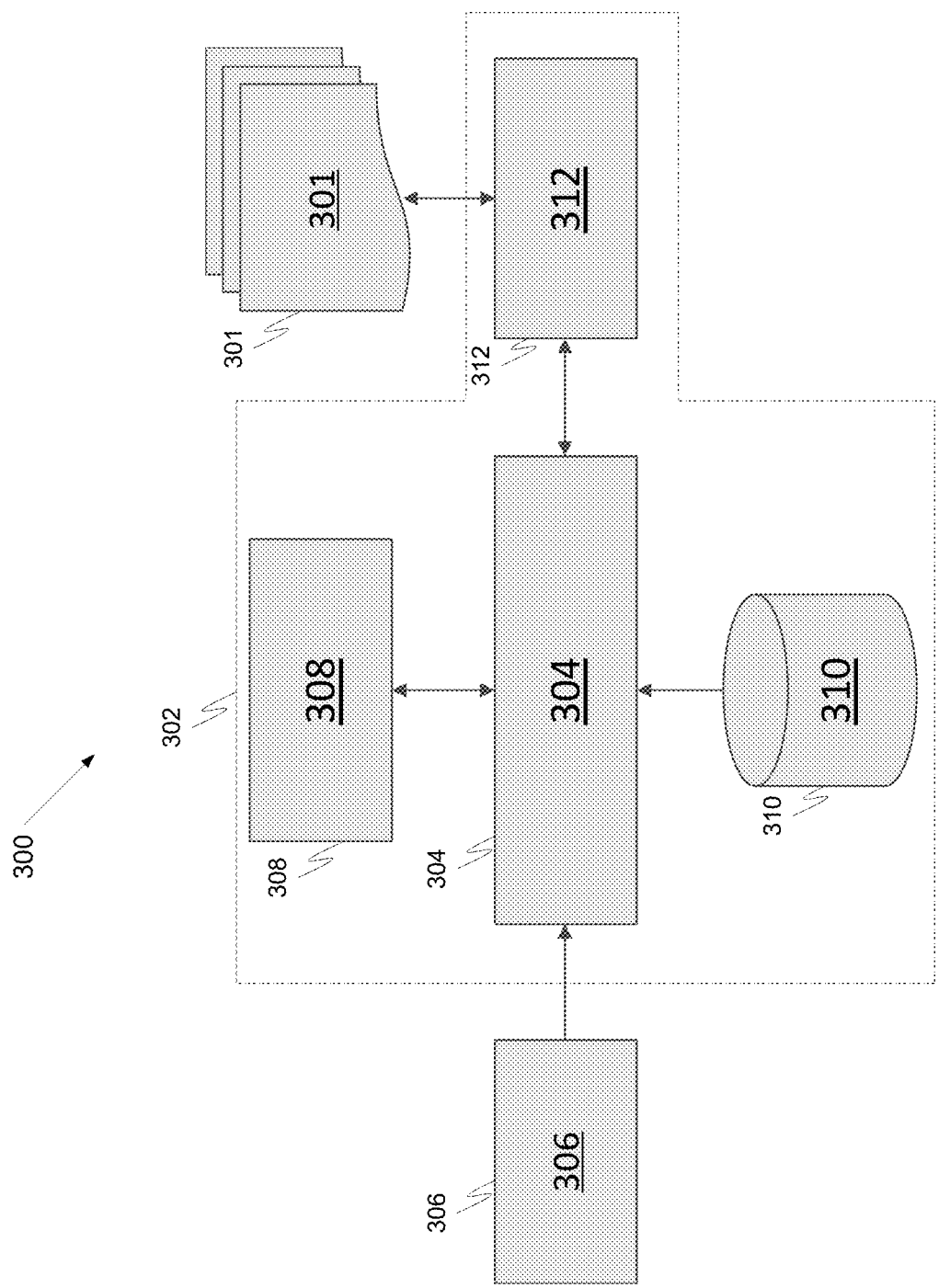
FIG. 3 is a block diagram depicting an example environment for a task allocation system, in accordance with various embodiments.

FIG. 3 is a block diagram depicting an example environment 300 for a task allocation system 302. The example task allocation system 302 is configured to dynamically allocate atomic computing tasks to a suite of networked computing devices with heterogeneous capabilities. The suite of networked computing devices includes onboard hardware and one or more of mobile devices, edge devices and cloud based servers. Each networked computing device includes one or more computing resources 301. Each computing resource 301 may include a central processing unit (CPU), a graphics processing unit (GPU), a digital signal processor (DSP), a math co-processor, an application specific integrated circuit (ASIC), a field programmable gate array (FPGA), and/or other processing device.

The example task allocation system 302 comprises one or more processors configured by programming instructions on non-transient computer readable media that implement task allocation system components. The example task allocation system components include a real-time scheduler module 304, a monitor 308, a task library 310, and a dispatcher module 312. The example real-time scheduler module 304 is configured to received job specifications and/or requests 306 for the performance of jobs by the computing resources 301, monitor the status of and connectivity to the computing resources 301 using information from the performance monitor 308, identify specific task implementations from the task library 310 and schedule the specific task implementations to the computing resources 301 to satisfy the job requests 306. The example dispatcher module 312 is configured to retrieve the specific task implementations and dispatches the specific task implementations for execution to specific computing resources 301 to which they have been assigned.

The example task library 310 includes a plurality of tasks. Each task is a specific implementation of an application that may execute using one or more of the computing resources 301. An application may have multiple implementations, wherein the different implementations of an application provide different levels of accuracy and resource usage during execution. The different implementations of an application are configured based on a trade-off between the level of accuracy of the results from execution of the implementation of the application and resource usage during execution.

Figure 4B:
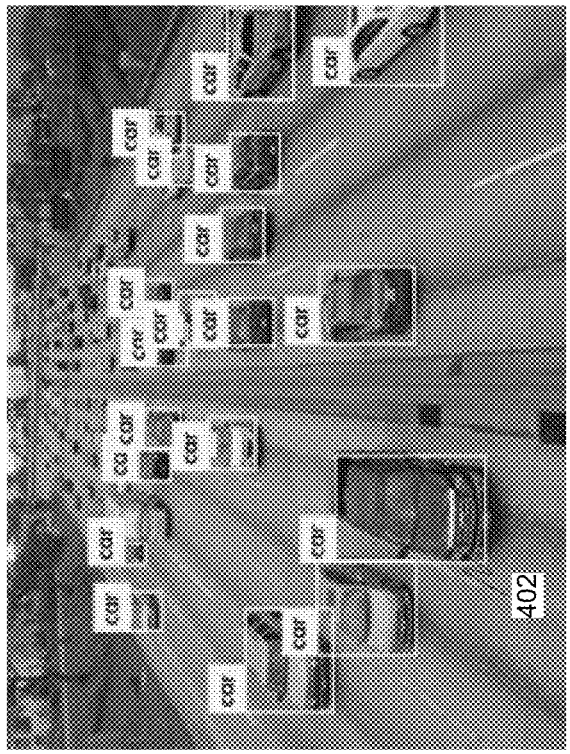
FIGS. 4A and 4B are diagrams of an example operating scenario that illustrates a potential benefit of providing different implementations of an application, in accordance with various embodiments.
Figure 4A:
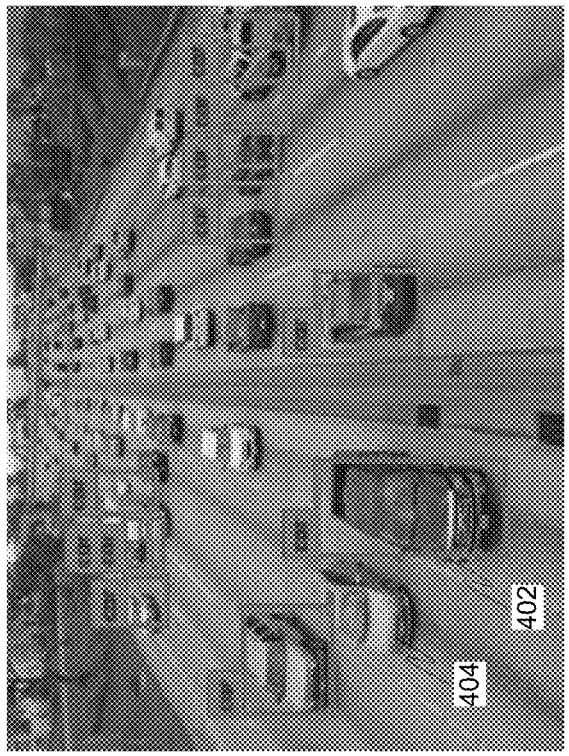

FIGS. 4A and 4B are diagrams of an example operating scenario that illustrates a potential benefit of providing different implementations of an application. In the example operating scenario, a vision system in a vehicle takes a snapshot 400 of the environment ahead of the vehicle. A detection system in the vehicle may request the execution of an application to detect objects in the snapshot 400. The application may have two implementations, a first implementation that provides a less accurate analysis of the snapshot 400 but requires fewer computing resources for execution and a second implementation that provides a more accurate analysis of the snapshot 400 but requires more computing resources for execution.

Depicted in FIG. 4A are the object detection results from the first example implementation. In the first example implementation, a 16-layer convolutional neural network (CNN), with 57.1% mean average precision (mAP), that executes in 4.8 ms/frame is applied. The first example implementation provides a less accurate analysis of the snapshot 400 (e.g., some cars 402 in the snapshot are identified and some of the cars 404 in the snapshot are not identified), but requires fewer computing resources for execution (e.g., executes in 4.8 ms per snapshot).

Depicted in FIG. 4B are the object detection results from the second example implementation. In the second example implementation, a 32-layer CNN, with 76.8% mAP, that executes in 14.9 ms/frame is applied. The second example implementation provides a more accurate analysis of the snapshot (e.g., more or all of the cars 402 in the snapshot are identified), but requires greater computing resources for execution (e.g., executes in 14.9 ms per snapshot). Depending on the workload of the computing resources, it may be advantageous to use the first implementation of the application to obtain some detection information because, against timing constraints, some information may be better than no information.

Referring back to FIG. 3, the example monitor 308 is configured to track devices and their available computing resources 301. The example monitor 308 is further configured to collect statistics regarding communication channels to and from the computing resources 301 and device speeds for the computing resources 301. The example performance monitor 308 is further configured to communicate the tracked data and statistics to the example real-time scheduler module 304.

The example real-time scheduler module 304 is configured to monitor available computing resources 301 and connectivity to the computing resources 301 using the monitor 308, receive a plurality of received job specifications and/or requests 306 wherein the specifications/requests 306 identify tasks requested for performance, prioritize applications to be executed when performing the tasks wherein more critical applications are assigned a higher priority, allocate computing resources 301 to the higher priority applications first, allocate remaining computing resources 301 to other applications, and select specific implementations of applications for assignment to specific computing resources 301 in a way that maximizes an overall utility.

The example real-time scheduler module 304 is configured to utilize a scheduling algorithm to determine which specific application implementation to schedule with which computing resource. The problem solved by the scheduling algorithm can be expressed as follows:

Assume $N_k$ heterogeneous processing nodes: $k_0, k_1, \ldots, k_{N_k-1}$

There are $N_j$ jobs, $j_0, j_1, \ldots, j_{N_j-1}$ $N_r$-dimensional vector of resources $R(k) \mapsto \mathbb{R}_{>0}^{N_r}$ for each node k The resource consumption is represented by $r(j, k, m)$ where $r(j,k,m) \mapsto \mathbb{R}_{\geq 0}^{N_r}$ vector of resources required by job j while running on node k using implementation m Let $X(j,k,m) \in \{0,1\}$ be the binary allocation variable, where it is 1 if job j is scheduled on node k using implementation m and 0 otherwise. A valid allocation or job schedule must satisfy the following constraints:

$$\forall k, R(k) \geq \sum_j \sum_m X(j, k, m) \cdot r(j, k, m) \quad (1)$$

$$\forall j, \sum_k \sum_m X(j, k, m) \leq 1 \quad (2)$$

Equation 1, the resource constraint, ensures that jobs assigned to a node do not exceed its resources, while Equation 2, the assignment constraint, ensures that a job is assigned at most once (one implementation on one node).

Let $u(j,k,m)$ the user-specified utility of running job j on node k using implementation m Then the goal is to:

$$\text{Maximize} \sum_j \sum_k \sum_m X(j, k, m) \cdot u(j, k, m)$$

-continued $$\text{subject to: } \forall k, R(k) \geq \sum_j \sum_k X(j,k,m) \cdot r(j,k,m)$$

$$\forall j, \sum_k \sum_m X(j,k,m) \leq 1$$

In one example, the example real-time scheduler module 304 is configured to execute an Integer Linear Program (ILP) as a scheduling algorithm to determine an assignment of specific implementations of applications to specific computing resources. The ILP may use rounding-based methods such as COIN-OR branch and cut (CBC) open-source ILP solver, or a Gurobi ILP solver.

In one example, the example real-time scheduler module 304 is configured to execute a greedy algorithm as a scheduling algorithm to determine an assignment of specific implementations of applications to specific computing resources and output the determined assignment of specific implementations to specific computing resources.

In one example, the greedy algorithm is configured to sort, based on utility ranking, application implementations wherein the application implementation with the highest utility is given the highest ranking; and schedule application implementations, in rank order, one by one at a best available node (e.g., computing resource 301), wherein an application implementation is scheduled if no other implementation of the application has already been scheduled and the best available node is capable of executing the application implementation.

Figure 5A:
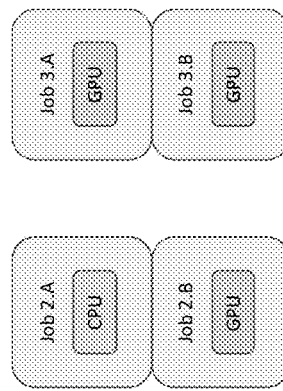
FIGS. 5A and 5B are diagrams illustrating the use of an example greedy algorithm to schedule application implementations for execution, in accordance with various embodiments.
Figure 5B:
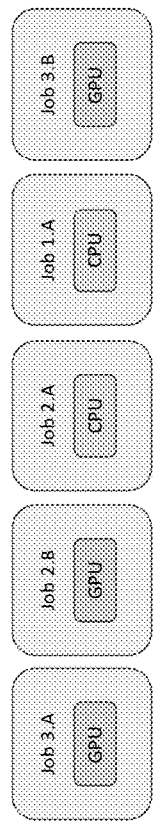
Figure 5B:
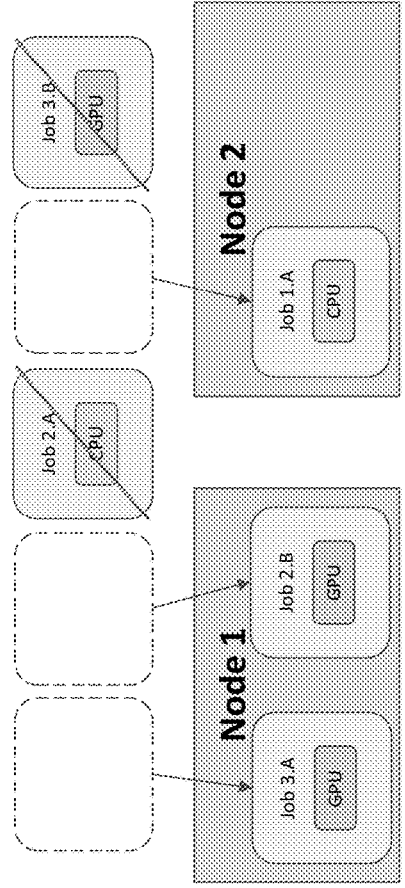

FIGS. 5A and 5B are diagrams illustrating the use of an example greedy algorithm to schedule application implementations for execution. Depicted in FIG. 5A is a block diagram illustrating example tasks and application implementations that may be scheduled by a system and the type of computing resource (e.g., CPU or GPU) that can be used to execute the application implementation. In this example, three tasks are to be performed, Job 1, Job 2 and Job 3. Job 1 has one application implementation—Job 1.A (for CPU execution), Job 2 has two application implementations—Job 2.A (for CPU execution) and Job 2.B (for GPU execution), and Job 3 has two application implementations—Job 3.A (for GPU execution) and Job 3.B (for GPU execution).

Depicted in FIG. 5B is a block diagram illustrating the example sorting and scheduling of the three tasks to computing nodes using an example greedy algorithm. The example greedy algorithm first sorts the application implementations based on utility ranking with the application implementation with the highest utility ranked first. In this example, Job 3.A is ranked first, Job 2.B is ranked second, Job 2.A is ranked third, Job 1.A is ranked fourth, and Job 3.B is ranked last. The application implementations are sorted according to their utility ranking in an order of highest utility rank to lowest utility rank.

Second, the example greedy algorithm schedules tasks to computing nodes. In this example, since Job 3.A is ranked first, it is scheduled for execution at Node 1, which has sufficient computing resources for Job 3.A. Job 2.B, which is ranked second, is scheduled next at Node 1, which has sufficient computing resources for Job 2.B in addition to Job 3.A. Job 2.A is not scheduled because another implementation of the application, Job 2.B, has already been scheduled. Job 1.A, which is next in utility rank, is scheduled next at Node 2, which has sufficient computing resources for Job 1.A. Job 3.B is not scheduled because another implementation of the application, Job 3.A, has already been scheduled.

In sum, the greedy algorithm schedules application implementations, in rank order, one by one at a best available node, wherein an application implementation is scheduled if no other implementation of the application has already been scheduled and the best available node is capable of executing the application implementation.

Referring back to FIG. 3, in another example, example real-time scheduler module 304 is configured with another example greedy algorithm to schedule specific application implementations for execution at specific nodes. The greedy algorithm in this example is configured to: enumerate all possible combinations of application implementations, wherein each combination is referred to herein as a bundle; calculate the utility of each bundle-node pair; sort bundles-node pairs by highest utility first; and schedule bundles one by one until all nodes have been assigned or all jobs have been scheduled, wherein assigned bundles cannot contain implementations of the same job.

Figure 6:
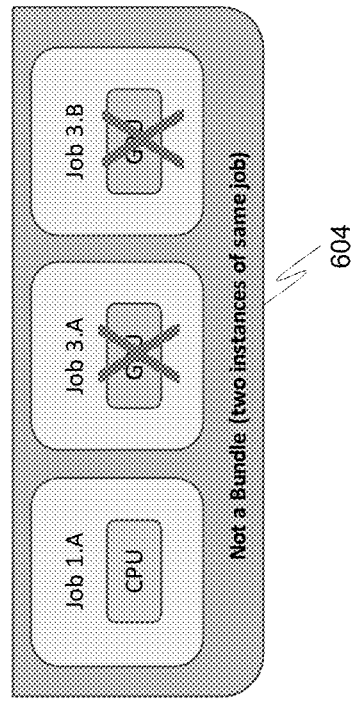
FIG. 6 is a diagram illustrating example jobs and example job bundles used when scheduling jobs using an example greedy algorithm, in accordance with various embodiments.
Figure 6:
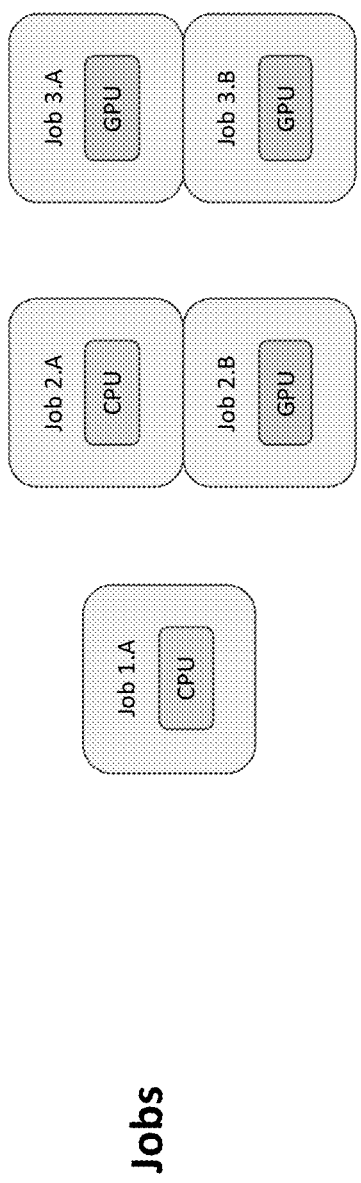
Figure 6:
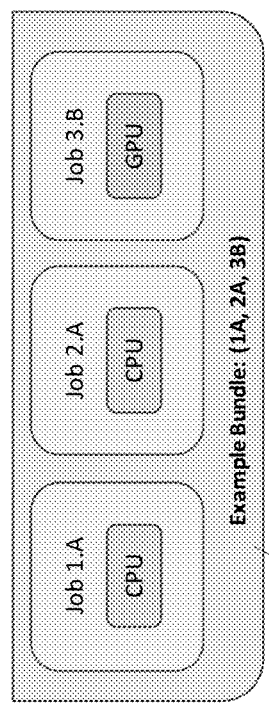

FIG. 6 is a diagram illustrating example jobs and example job bundles used when scheduling jobs using an example greedy algorithm. Depicted in FIG. 6 is a block diagram illustrating example tasks and application implementations that may be scheduled by a system and the type of computing resource (e.g., CPU or GPU) that can be used to execute the application implementation. In this example, three tasks are to be performed, Job 1, Job 2 and Job 3. Job 1 has one application implementation—Job 1.A (for CPU execution), Job 2 has two application implementations—Job 2.A (for CPU execution) and Job 2.B (for GPU execution), and Job 3 has two application implementations—Job 3.A (for GPU execution) and Job 3.B (for GPU execution).

FIG. 6 also illustrates the enumeration of all possible combinations of application implementations (e.g., bundles). As illustrated, in this example a bundle can consist of one application implementation (e.g., (1A), (2A), (2B), (3A), (3B)). A bundle, in this example, can consist of two application implementations (e.g., (1A, 2A), (1A, 2B), (1A, 3A), (1A, 3B), (2A, 3A), (2A, 3B), (2B, 3A), (2B, 3B)). A bundle, in this example, can consist of three application implementations (1A, 2A, 3A), (1A, 2A, 3B), (1A, 2B, 3A), (1A, 2B, 3B). A bundle can only include one implementation of the same application—it cannot include two or more implementation of the same application. As illustrated, example bundle 602 is a proper bundle because it contains no more than one implementation of the same application—it contains one implementation of each of application Jobs 1, 2, and 3 (1A, 2A, 3B). As illustrated, set 604 cannot be a bundle—it includes two implementation of the same application (Job 3.A and Job 3.B).

Figure 7A:
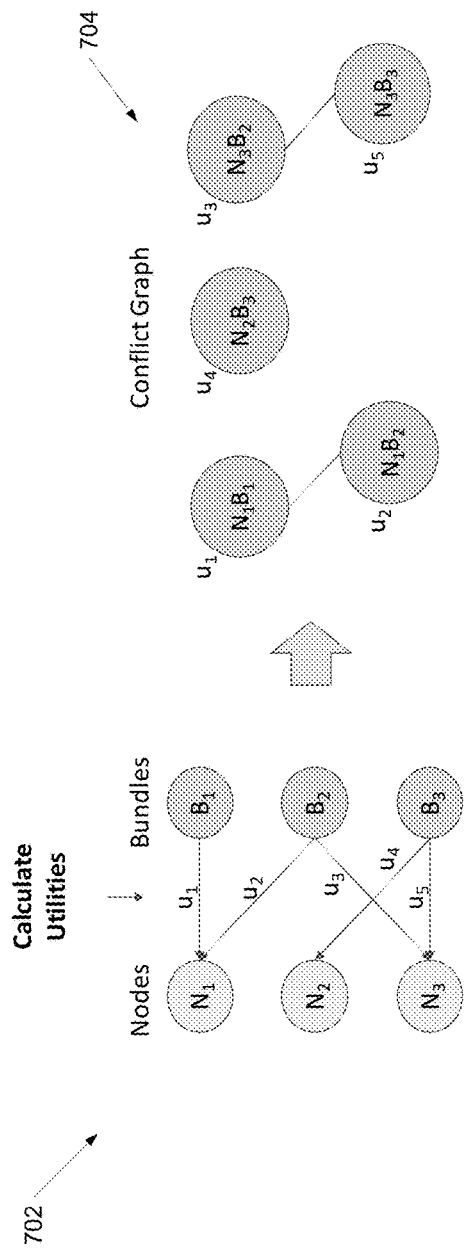
FIGS. 7A and 7B are diagrams illustrating the sorting and scheduling of bundles to nodes (e.g., computing resources) using the example greedy algorithm, in accordance with various embodiments.
Figure 7B:
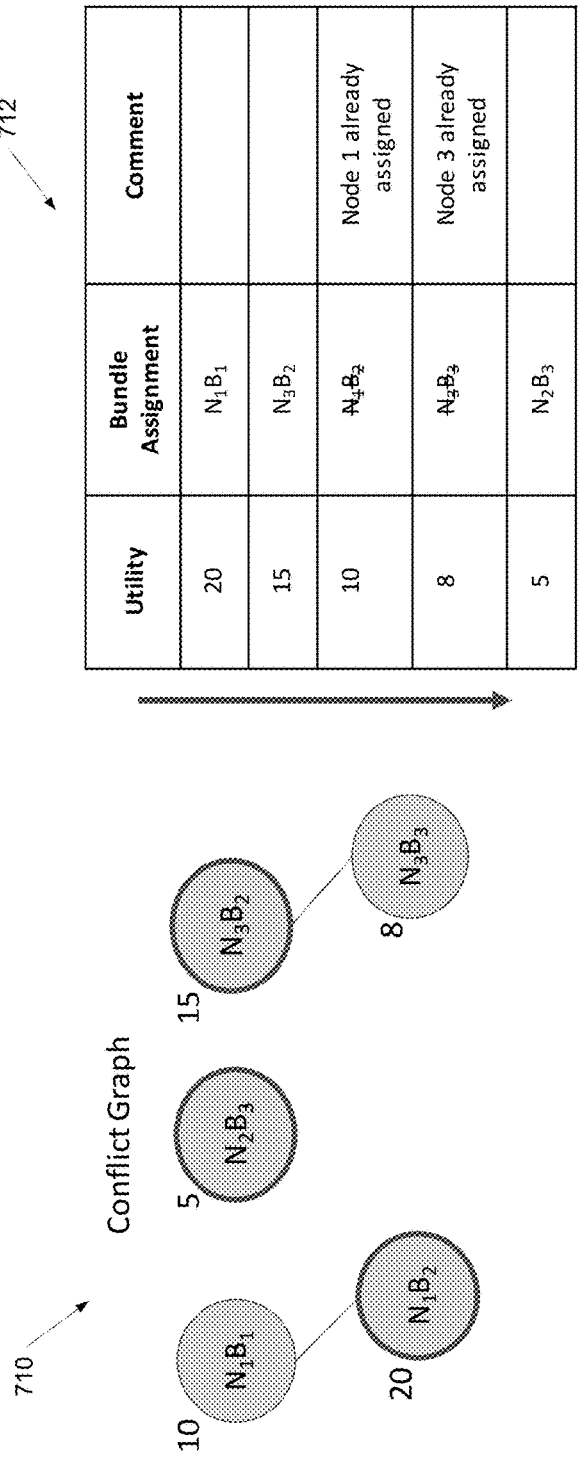

FIGS. 7A and 7B are diagrams illustrating the sorting and scheduling of bundles to nodes (e.g., computing resources) using the example greedy algorithm. Depicted in FIG. 7A is a graph 702 that illustrates the potential assignment of bundles to nodes. Although only a few potential bundle to node combinations are shown, the graph may disclose all possible bundle to node combinations. In this example, the graph shows that bundles B1 or B2 could be assigned to node 1 (N1), only bundle B3 could be assigned to node 2 (N2) and bundles B2 and B3 could be assigned to node 3 (N3). In addition to depicting possible bundle to node assignments, depicted are utility scores that are calculated by the example algorithm and assigned to each potential bundle to node assignment. In this example, potential bundle to node assignment (N1B1) is assigned a calculated utility value of u1, potential bundle to node assignment (N1B2) is assigned a calculated utility value of u2, potential bundle to node assignment (N3B2) is assigned a calculated utility value of u3, potential bundle to node assignment (N2B3) is assigned a calculated utility value of u4, and potential bundle to node assignment (N3B3) is assigned a calculated utility value of u5.

Also depicted is a conflict graph 704 that shows the competing potential bundles that can be assigned to each node and the calculated utility value for each potential bundle to node assignment. The conflict graph 704 shows that node assignments may include either bundle to node combination N1B1 or N1B2, node combination N2B3, and either bundle to node combination N3B2 or N3B3.

FIG. 7B is a diagram illustrating the conversion of information from the conflict graph 710 to an actual bundle to node assignment using the example greedy algorithm. The conflict graph 710, in this example, shows the competing potential bundles that can be assigned to each node and the calculated utility value for each potential bundle to node assignment, and shows that potential bundle to node assignment (N1B1) is assigned a calculated utility value of 20, potential bundle to node assignment (N1B2) is assigned a calculated utility value of 10, potential bundle to node assignment (N3B2) is assigned a calculated utility value of 15, potential bundle to node assignment (N2B3) is assigned a calculated utility value of 5, and potential bundle to node assignment (N3B3) is assigned a calculated utility value of 8.

FIG. 7B also includes a table 712 for use in converting data from the conflict graph 710 to actual bundle to node assignments. Table 712 discloses that since potential bundle to node assignment (N1B1) is assigned the highest calculated utility value at 20, bundle B1 is scheduled at node 1 (N1). Because potential bundle to node assignment (N3B2) is assigned the next highest calculated utility value at 15, bundle B2 is scheduled at node 3 (N3) since node 3 (N3) has not already been assigned. Even though potential bundle to node assignment (N1B2) is assigned the next highest calculated utility value at 10, bundle B2 is not scheduled at node 1 (N1) because node 1 (N1) has already been assigned. Even though potential bundle to node assignment (N3B3) is assigned the next highest calculated utility value at 8, bundle B3 is not scheduled at node 3 (N3) because node 3 (N3) has already been assigned. Because potential bundle to node assignment (N2B3) is assigned the next highest calculated utility value at 5, bundle B3 is scheduled at node 2 (N2) since node 2 (N2) has not already been assigned.

In sum, table 712 illustrates that the example greedy algorithm sorts bundles-node pairs by highest utility first and schedule bundles one by one until all nodes have been assigned or all jobs have been scheduled.

Referring back to FIG. 3, the example dispatcher module 312 is configured to dispatch the assigned specific implementations of applications to their assigned computing resource for execution. Therefore, the assignments made via a greedy algorithm are caused to be implemented by the example dispatcher module 312.

Figure 8:
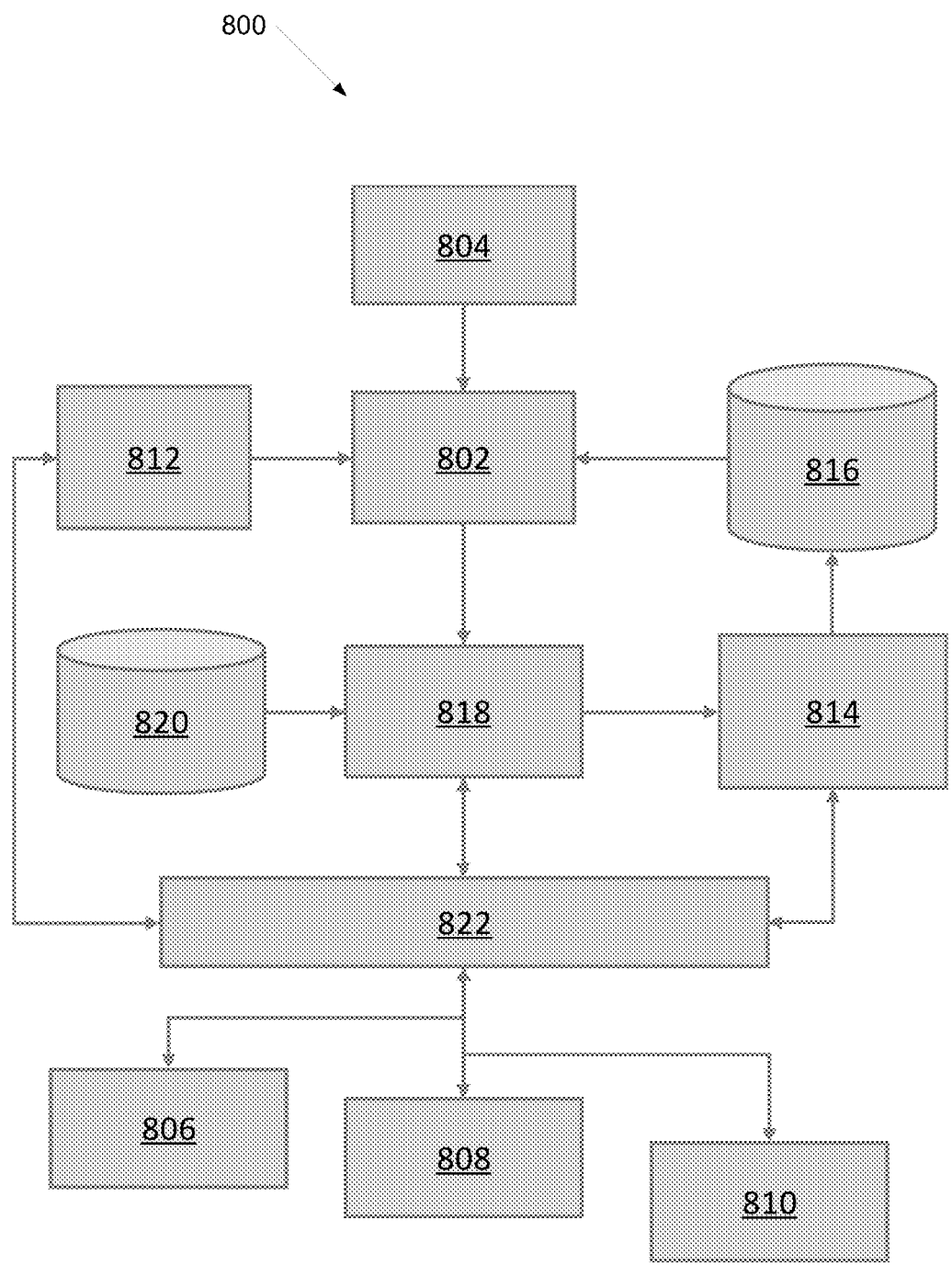
FIG. 8 is an example flow diagram illustrating example components in an example environment for an example task allocation system, in accordance with various embodiments.

FIG. 8 is an example flow diagram illustrating example components in an example environment 800 for an example task allocation system. The example task allocation system is configured to dynamically allocate atomic computing tasks to a suite of networked computing devices with heterogeneous capabilities.

An example real-time scheduler module 802 receives task requests 804 for the performance of jobs by computing resources in computing devices. The example computing devices include local computing devices 806 (e.g., onboard controllers in a vehicle), edge computing devices 808 (e.g., controllers in traffic equipment), and cloud computing devices 810 (e.g., cloud-based servers). The example computing devices 806, 808, 810 includes computing resources consisting of CPUs, GPUs, ASICs, FPGAs, DSPs, etc.

The example real-time scheduler module 802 monitors the status of and connectivity to the computing resources via a resource monitor 812 and a performance monitor 814. The example resource monitor 812 tracks devices 806, 808, 810 and their available resources. The example performance monitor 814 collects statistics about the communication channels and device speed.

The example real-time scheduler module 802 identifies specific task implementations from the task profiles database 816. The example task profiles database 816 includes static and dynamic data about tasks, including resource use, latency, reliability, etc. Based on the static and dynamic data about tasks, available resources, and communication channels and device speed, the example real-time scheduler module 802 schedules specific task implementations to specific computing resources to satisfy the task requests 804. The example real-time scheduler module 802 runs scheduling algorithms to assign jobs to devices for execution. The scheduling algorithms may include the use of ILP or greedy algorithms.

The example dispatcher module 818 retrieves the specific task implementations that have been scheduled by the example real-time scheduler module 802 from a task library 820 and dispatches the specific task implementations for execution to specific computing resources within computing devices 806, 808, 810 via a communications manager 822. The example task library 820 includes binaries of the task implementations. The example communications manager 822 manages communication links between devices. The communication links may be implemented using DSRC, cellular wireless network (e.g., LTE, 5G or others), Ethernet, controller area network (CAN), wireless local area network (WLAN), and/or other communication protocols.

Figure 9:
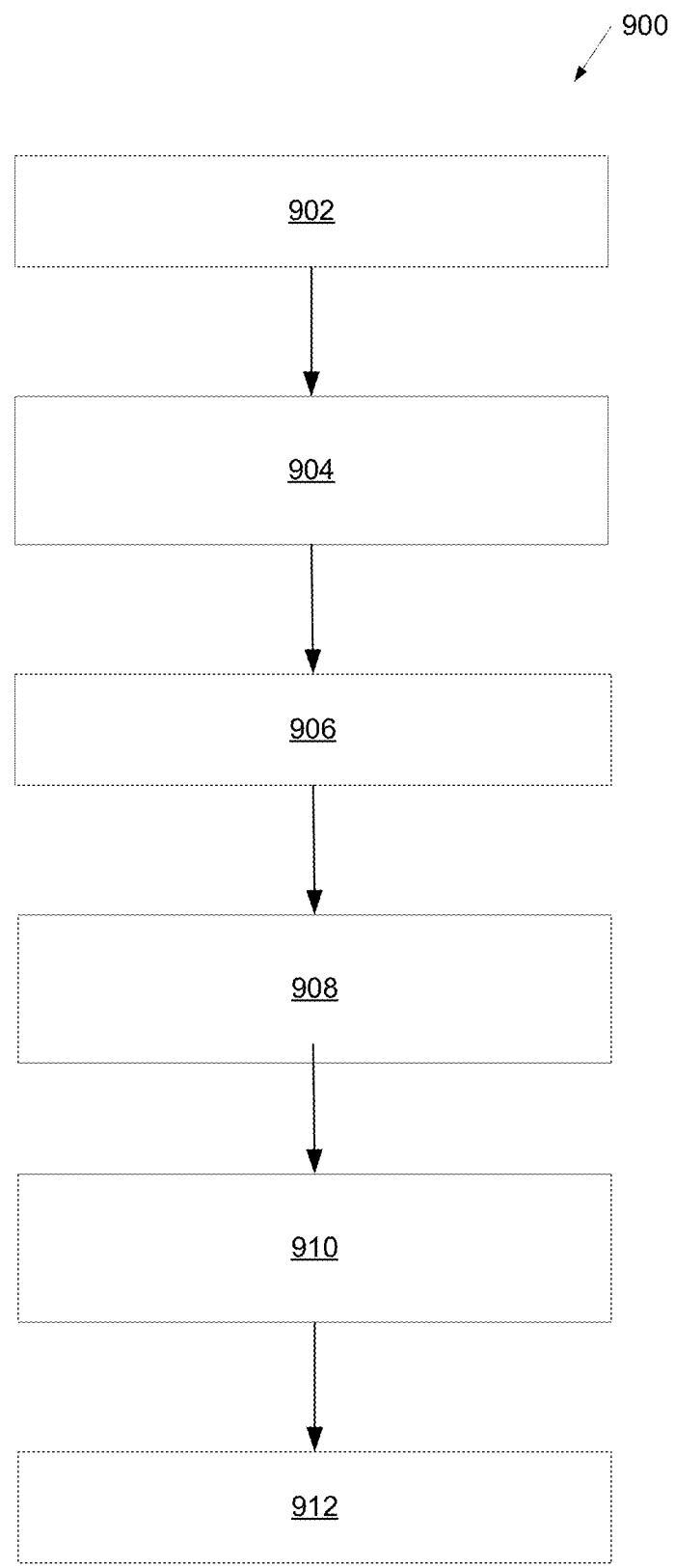
FIG. 9 is a process flow chart depicting an example process in an example task allocation system, in accordance with various embodiments.

FIG. 9 is a process flow chart depicting an example process 900 in an example task allocation system. The order of operation within process 900 is not limited to the sequential execution as illustrated in the figure, but may be performed in one or more varying orders as applicable and in accordance with the present disclosure.

The example process 900 includes receiving task requests for the performance of jobs by computing resources (operation 902) in computing devices. The example computing devices may include local computing devices 806 (e.g., onboard controllers in a vehicle), edge computing devices 808 (e.g., controllers in traffic equipment), and cloud computing devices 810 (e.g., cloud-based servers). The example computing devices 806, 808, 810 may include computing resources consisting of central processing units (CPUs), graphic processor units (GPUs), digital signal processors (DSPs), application specific integrated circuits (ASICs), field programmable gate arrays (FPGAs), or others.

The example process 900 includes monitoring the status of and connectivity to the computing resources (operation 904). The monitoring may include tracking computing devices and their available computing resources collecting statistics about communication channels and computing device speed.

The example process 900 includes identifying specific task implementations for scheduling (operation 906). The specific task implementations may be identified from a task profiles database 816. The example task profiles database 816 may include static and dynamic data about tasks, including resource use, latency, reliability, etc.

The example process 900 includes scheduling specific task implementations to specific computing resources (operation 908). The specific task implementations may be scheduled to specific computing resources to satisfy the task requests based on the static and dynamic data about tasks, available resources, and communication channels and device speed. Scheduling specific task implementations to specific computing resources may involve running scheduling algorithms to assign jobs to devices for execution. The scheduling algorithms may include ILP-based algorithm. The scheduling algorithms may include greedy algorithms.

A greedy scheduling algorithm may be configured to sort, based on utility ranking, application implementations wherein the application implementation with the highest utility is given the highest ranking; and schedule application implementations, in rank order, one by one at a best available node (e.g., computing resource), wherein an application implementation is scheduled if no other implementation of the application has already been scheduled and the best available node is capable of executing the application implementation. An application implementation's utility is related to priority and can be a function of data contained in the task profiles database, the implementation chosen, and where it is scheduled to be executed.

A greedy scheduling algorithm may be configured to: enumerate all possible combinations of application implementations, wherein each combination is referred to herein as a bundle; calculate the utility of each bundle-node pair; sort bundle-node pairs by highest utility first; and schedule bundles one by one until all nodes have been assigned or all jobs have been scheduled, wherein assigned bundles cannot contain implementations of the same job.

The example process 900 includes retrieving the specific task implementations that have been scheduled from a task library and (operation 910) dispatching the specific task implementations for execution to specific computing resources (operation 912). The example task library may include binaries of the different task implementations. The different task implementations provide various implementations of tasks (options) for different hardware, levels of accuracy based on acceptable trade-offs.

The dispatching may be performed via a communications manager. The communications manager may be configured to manage communication links between devices. The communication links may be implemented using DSRC, cellular wireless network (e.g., LTE, 5G or others), Ethernet, controller area network (CAN), wireless local area network (WLAN), and/or other communication protocols.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A task allocation system in a vehicle for dynamically allocating atomic computing tasks for use with the vehicle to a suite of networked computing resources with heterogeneous capabilities, the system comprising:

a task library comprising a plurality of tasks, each task being one of a plurality of different implementations of an application, wherein the different implementations of an application provide different levels of accuracy and resource usage during execution, wherein the different implementations are configured based on a trade-off between level of accuracy and resource usage during execution;

a real-time scheduler module comprising one or more processors configured by programming instructions on non-transitory computer readable media, the scheduler module configured to: monitor available computing resources comprising on-board computing resources provided by the vehicle and off-board computing resources provided by one or more of a mobile device, an edge device and a cloud based server, monitor connectivity to the computing resources, receive a plurality of task requests wherein the task requests are a specification of jobs requested for performance, prioritize applications to be executed when performing the jobs wherein more critical applications are assigned a higher priority, allocate on-board computing resources and off-board computing resources provided by the one or more of a mobile device, an edge device and a cloud based server to the prioritized applications wherein the computing resources are allocated to higher priority applications and remaining computing resources are allocated to other applications, and select specific implementations of applications for assignment to execute on specific computing resources in a way that maximizes an overall utility;

wherein the real-time scheduler module is configured to execute a greedy algorithm to determine an assignment of specific implementations of applications to execute on specific computing resources, wherein the greedy algorithm is configured to:
schedule application implementations, in rank order based on utility of the application implementations, to execute on available computing nodes, or
schedule bundles of applications implementations, in rank order based on utility measurements for different combinations of bundles and computing nodes, to execute on available computing nodes; and a dispatcher module comprising one or more processors configured by programming instructions on non-transitory computer readable media, the dispatcher module configured to dispatch the assigned specific implementations of applications to their assigned computing resource for execution.

2. The task allocation system of claim 1, wherein the suite of networked computing devices comprises onboard hardware, a mobile device, an edge device, and a cloud based server.

3. The task allocation system of claim 1, wherein each of the on-board and the off-board computing resources comprises one or more of central processing units (CPUs), graphic processor units (GPUs), digital signal processors (DSPs), application specific integrated circuits (ASICs), and field programmable gate arrays (FPGAs).

4. The task allocation system of claim 1, wherein the greedy algorithm is configured to:
rank job implementations based on utility wherein the job implementation with the highest utility is ranked first; and
schedule job implementations, in rank order, one by one at a best available computing node, wherein a job implementation is scheduled if no other implementation of the job has already been scheduled and the best available computing node is capable of executing the job implementation.

5. The task allocation system of claim 1, wherein the greedy algorithm is configured to:
enumerate all possible combinations of jobs wherein each possible combination of jobs is referred to as a bundle;
determine potential bundle-node pairs;
calculate a utility measurement for each potential bundle-node pair;
sort the bundle-node pairs in utility order with the bundle-node pair with the highest utility positioned first; and
schedule bundles one by one until all nodes have been assigned or all jobs have been scheduled, wherein assigned bundles cannot contain implementations of the same job.

6. The task allocation system of claim 1, further comprising a task profiles database containing task profiles for each application implementation, the task profiles including static and dynamic data about tasks, including resource use, latency, and reliability, wherein the task profiles are accessible by the scheduler module when selecting specific implementations of applications for assignment to specific computing resources.

7. The task allocation system of claim 1, further comprising a resource monitor configured to track devices and their available computing resources wherein the real-time scheduler module is configured to monitor available computing resources via information provided by the resource monitor.

8. The task allocation system of claim 1, further comprising a performance monitor configured to collect statistics about the communication channels and device speed.

9. The task allocation system of claim 1, further comprising a communications manager configured to manage communication links between devices providing computer resources, the communication links implemented using a plurality of dedicated short-range communications (DSRC), cellular wireless network, Ethernet, wireless local area network (WLAN), and controller area network (CAN).

10. A processor-implemented method in a vehicle for dynamically allocating automotive atomic computing tasks to a suite of networked computing resources with heterogeneous capabilities, the method comprising:
monitoring, by a real-time scheduler executed by a processor in the vehicle, the status of and connectivity to computing resources comprising on-board computing resources provided by the vehicle and off-board computing resources provided by one or more of a mobile device, an edge device and a cloud based server;
identifying, by the processor, a task library comprising a plurality of tasks, each task being one or a plurality of different implementations of an application, wherein the different implementations of the application provide different levels of accuracy and resource usage during execution, wherein the different implementations are configured based on a trade-off between level of accuracy and resource usage during execution;
receiving, by the processor, a plurality of task requests wherein the task requests are a specification of jobs requested for performance;
prioritizing, by the processor, applications to be executed when performing the jobs wherein more critical applications are assigned a higher priority;
allocating, by the processor, on-board computing resources and off-board computing resources, wherein the computing resources are allocated to higher priority applications and remaining computing resources are allocated to other applications;
selecting, by a greedy algorithm executed by the processor, specific implementations of applications for assignment to execute on specific computing resources in a way that maximizes an overall utility, wherein the greedy algorithm is configured to:
schedule application implementations, in rank order based on utility of the application implementations, to execute on available computing nodes, or
schedule bundles of applications implementations, in rank order based on utility measurements for different combinations of bundles and computing nodes, to execute on available computing nodes;
retrieving, by the processor, the specific implementations of applications that have been selected from the task library; and
dispatching, by the processor, the selected specific implementations of applications for execution to their assigned specific computing resources.

11. The method of claim 10, wherein each of the on-board and the off-board computing resources comprise one or more of central processing units (CPUs), graphic processor units (GPUs), digital signal processors (DSPs), application specific integrated circuits (ASICs), and field programmable gate arrays (FPGAs) and the computing resources are located in a plurality of computing devices onboard the vehicle, edge computing devices, and cloud-based computing devices.

12. The method of claim 10, wherein the monitoring comprises tracking computing devices and their available computing resources and collecting statistics about communication channels and computing device speed.

13. The method of claim 10, wherein the specific implementations of applications are identified from a task profile database that includes static and dynamic data about tasks, including resource use, latency, and reliability.

14. The method of claim 10, wherein the specific implementations of applications are scheduled based on the static and dynamic data about tasks, available resources, and communication channels and device speed.

15. The method of claim 10 wherein:
the greedy algorithm is configured to sort, based on utility ranking, task implementations wherein the task implementation with the highest utility is given the highest ranking; and
the greedy algorithm is configured to schedule task implementations, in rank order, one by one at a best available computing node, wherein a task implementation is scheduled if no other implementation of the task has already been scheduled and the best available computing node is capable of executing the task implementation.

16. The method of claim 10, wherein:
the greedy algorithm is configured to:
enumerate all possible combinations of application implementations, wherein each combination is referred to as a bundle;
determine potential bundle-node pairs, calculate the utility of each bundle-node pair;
sort the bundle-node pairs in utility order with the bundle-node pair with the highest utility positioned first; and
schedule bundles one by one until all nodes have been assigned or all jobs have been scheduled, wherein assigned bundles cannot contain implementations of the same job.

17. The method of claim 10, wherein the task library comprises binaries of different task implementations and the different task implementations provide various task implementation options.

18. A vehicle comprising:
a plurality of on-board computing resources;
a task library comprising a plurality of tasks, each task being one of a plurality of different implementations of an application, wherein the different implementations of an application provide different levels of accuracy and resource usage during execution, wherein the different implementations are configured based on a trade-off between level of accuracy and resource usage during execution;
a real-time scheduler module comprising one or more processors configured by programming instructions on non-transitory computer readable media, the scheduler module configured to: monitor available computing resources comprising the on-board computing resources and off-board computing resources provided by one or more of a mobile device, an edge device and a cloud based server, monitor connectivity to the computing resources, receive a plurality of task requests wherein the task requests are a specification of jobs requested for performance, prioritize applications to be executed when performing the jobs wherein more critical applications are assigned a higher priority, allocate on-board computing resources and computing resources provided by the one or more of a mobile device, an edge device and a cloud based server to the prioritized applications wherein the computing resources are allocated to higher priority applications, and remaining computing resources are allocated to other applications, and select specific implementations of applications for assignment to execute on specific computing resources in a way that maximizes an overall utility;
wherein the real-time scheduler module is configured to execute a greedy algorithm to determine an assignment of specific implementations of applications to execute on specific computing resources,
wherein the greedy algorithm is configured to:
schedule application implementations, in rank order based on utility of the application implementations, to execute on available computing nodes, or
schedule bundles of applications implementations, in rank order based on utility measurements for different combinations of bundles and computing nodes, to execute on available computing nodes; and
a dispatcher module comprising one or more processors configured by programming instructions on non-transitory computer readable media, the dispatcher module configured to dispatch the assigned specific implementations of applications to their assigned computing resource for execution.

19. The vehicle of claim 18, wherein the greedy algorithm is configured to:
rank job implementations based on utility wherein the job implementation with the highest utility is ranked first; and
schedule job implementations, in rank order, one by one at a best available computing node, wherein a job implementation is scheduled if no other implementation of the job has already been scheduled and the best available computing node is capable of executing the job implementation.

20. The vehicle of claim 18, wherein the greedy algorithm is configured to:
enumerate all possible combinations of jobs wherein each possible combination of jobs is referred to as a bundle;
determine potential bundle-node pairs;
calculate a utility measurement for each potential bundle-node pair;
sort the bundle-node pairs in utility order with the bundle-node pair with the highest utility positioned first; and
schedule bundles one by one until all nodes have been assigned or all jobs have been scheduled, wherein assigned bundles cannot contain implementations of the same job.

* * * * *